_(12)_ United States Patent
Jin et al.

(10) Patent No.: US 9,640,102 B2
(45) Date of Patent: May 2, 2017

(54) IMAGE DATA PROCESSING METHOD AND DEVICE THEREOF

(71) Applicant: SHENZHEN CHINA STAR OPTOELECTRONICS TECHNOLOGY CO., LTD, Shenzhen (CN)

(72) Inventors: Yufeng Jin, Shenzhen (CN); Hao Li, Shenzhen (CN); JhenWei He, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 170 days.

(21) Appl. No.: 14/411,929

(22) PCT Filed: Oct. 24, 2014

(86) PCT No.: PCT/CN2014/089433
§ 371 (c)(1),
(2) Date: Dec. 30, 2014

(87) PCT Pub. No.: WO2016/061812
PCT Pub. Date: Apr. 28, 2016

(65) Prior Publication Data
US 2016/0275841 A1    Sep. 22, 2016

(30) Foreign Application Priority Data

Oct. 21, 2014  (CN) .......................... 2014 1 0562720

(51) Int. Cl.
*G09G 5/02*      (2006.01)
*G09G 3/20*      (2006.01)
(Continued)

(52) U.S. Cl.
CPC ............ *G09G 3/2003* (2013.01); *G09G 5/02* (2013.01); *H04N 9/646* (2013.01); *H04N 9/67* (2013.01);
(Continued)

(58) Field of Classification Search
CPC ... G09G 2300/0452; G09G 2320/0276; G09G 2320/0626; G09G 2340/06; G09G 2320/0673
(Continued)

(56) References Cited

U.S. PATENT DOCUMENTS

2014/0022271 A1    1/2014  Lin et al.
2014/0028739 A1*   1/2014  Takahashi ............ G09G 3/2003
                                                      345/690
(Continued)

FOREIGN PATENT DOCUMENTS

CN          102800297 A       11/2012

*Primary Examiner* — Xiao Wu
*Assistant Examiner* — Sarah Lhymn
(74) *Attorney, Agent, or Firm* — Mark M. Friedman

(57) ABSTRACT

An image data processing method and a device thereof are disclosed, and the method includes: receiving first red, green, and blue image data; executing a gamma correction process for the first red, green, and blue sub-pixel image data; generating a first white sub-pixel image data; generating a third red, green, and blue sub-pixel image data and executing an inverse gamma conversion process. The present invention is able to convert RGB image data to RGBW image data.

18 Claims, 5 Drawing Sheets

(51) Int. Cl.
*H04N 9/64* (2006.01)
*H04N 9/67* (2006.01)
*H04N 9/69* (2006.01)

(52) U.S. Cl.
CPC ....... *H04N 9/69* (2013.01); *G09G 2300/0452* (2013.01); *G09G 2320/0276* (2013.01); *G09G 2320/0626* (2013.01); *G09G 2320/0673* (2013.01); *G09G 2340/06* (2013.01)

(58) Field of Classification Search
USPC ................................ 345/600, 603, 604, 606
See application file for complete search history.

(56) References Cited

U.S. PATENT DOCUMENTS

| | | | | |
|---|---|---|---|---|
| 2014/0320546 A1* | 10/2014 | Lim | ..................... | G09G 3/3291 345/690 |
| 2015/0181182 A1* | 6/2015 | Lin | ..................... | H04N 9/3182 348/453 |
| 2015/0348500 A1* | 12/2015 | Lin | ..................... | G09G 3/3406 345/600 |

* cited by examiner

IMAGE DATA PROCESSING METHOD AND DEVICE THEREOF

FIELD OF THE INVENTION

The present invention relates to a technical field of image data processing, and more particularly to an image data processing method and device thereof.

BACKGROUND OF THE INVENTION

A traditional display device generally needs a corresponding image data processing process before displaying images. The image data generally includes R (Red), G (Green), and B (Blue) data. The image data is processed so as to display the image on the display device.

Traditional image data processing techniques generally include the following two schemes:

First, Ri (Red input), Gi (Green input), and Bi (Blue input) are set as the original data and Ro (Red output), Go (Green output) and Bo (Blue output) are the processed data, then:

$Ro=Ri-Wo;$ $Go=Gi-Wo;$ $Bo=Bi-Wo;$

Wo=min[Ri, Gi, Bi], where Wo represents white output data, and min[Ri, Gi, Bi] represents the minimum value among the Ri, Gi, and Bi. In the following description, min[Ri, Gi, Bi] is referred to as min.

Second, Ri, Gi, and Bi are set as the original data and Ro, Go, Bo are the processed data;

$Ro=Ri*S-Wo;$ $Go=Gi*S-Wo;$ $Bo=Bi*S-Wo,$ wherein $S=1+\min/(\max-\min)$ when $\min/\max<\frac{1}{2}$, or $S=2$, when $\min/\max>\frac{1}{2}$;

Wo=min[Ri, Gi, Bi], wherein the max is max[Ri, Gi, Bi]. The max[Ri, Gi, Bi] equals the biggest value among the Ri, Gi, and Bi.

The above described first technical solution separates the W (White) component, which is synthesized by the original RGB components. The technical solution cannot improve the transmittance by fully using the W component adequately.

The above described second technical solution increases the original RGB components, and then separates the W component. The technical solution is able to improve the brightness of the display panel. However, evaluating the value of Wo is limited by the way in which the brightness is maximized, as a result, the values of Ro, Go, and Bo cannot vary smoothly with the grayscales, as illustrated in FIG. 1.

Therefore, it is necessary to provide a new technical solution to solve the above described problems.

SUMMARY OF THE INVENTION

An object of the present invention is to provide an image data processing method and device thereof, which can be implemented to convert RGB image data to RGBW image data.

To solve the above described problem, the technical solution of the present invention is as follows:

An image data processing method is provided, and the method comprises the following steps: (A) receiving a first image data, and the first image data comprises a first red sub-pixel image data, a first green sub-pixel image data, and a first blue sub-pixel image data; (B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data; (C) generating a first white sub-pixel image data according to the second red sub-pixel image data, the second green sub-pixel image data, and the second blue sub-pixel image data; (D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and (E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data; and the step (D) comprises the following steps: (d1) determining a maximum value among the second red sub-pixel image data, the second green sub-pixel image data, and the second blue sub-pixel image data; (d2) calculating a gain coefficient according to the following formula: the gain coefficient=(a grayscale value corresponding to the first white sub-pixel image data+the maximum value)/(the maximum value); (d3) generating the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data; and the step (C) comprises the following steps: (c1) calculating the grayscale value corresponding to the first white sub-pixel image data according to the following formula: the grayscale value corresponding to the first white sub-pixel image data=2 times a preset variable to the fifth power−4 times the preset variable to the fourth power+the preset variable to the third power+the preset variable to the second power+the preset variable, and the value of the preset variable is smaller than a predetermined value; or the grayscale value corresponding to the first white sub-pixel image data=−2 times a preset variable to the fifth power+9 times the preset variable to the fourth power−14 times the preset variable to the third power+8 times the preset variable to the second power, and the value of the preset variable is greater than or equal to the predetermined value.

In the above described image data processing method, the step (d3) comprises the following steps: (d31) calculating a grayscale value corresponding to the third red sub-pixel image data according to the following formula: the grayscale value corresponding to the third red sub-pixel image data=a grayscale value corresponding to the second red sub-pixel image data*the gain coefficient−the grayscale value corresponding to the first white sub-pixel image data; (d32) calculating a grayscale value corresponding to the third green sub-pixel image data according to the following formula: the grayscale value corresponding to the third green sub-pixel image data=a grayscale value corresponding to the second green sub-pixel image data*the gain coefficient−the grayscale value corresponding to the first white sub-pixel image data; (d33) calculating a grayscale value corresponding to the third blue sub-pixel image data according to the following formula: the grayscale value corresponding to the third blue sub-pixel image data=a grayscale value corresponding to the second blue sub-pixel image data*the gain coefficient−the grayscale value corresponding to the first white sub-pixel image data.

In the above described image data processing method, the preset variable equals the smallest value among the grayscale value corresponding to the second red sub-pixel image data, the grayscale value corresponding to the second green sub-pixel image data, and the grayscale value corresponding to the second blue sub-pixel image data.

In the above described image data processing method, the predetermined value is in the range of 105 to 144.

An image data processing method is provided, the method comprises the following steps: (A) receiving a first image data, and the first image data comprises a first red sub-pixel image data, a first green sub-pixel image data, and a first blue sub-pixel image data; (B) executing a gamma correction process for the first red sub-pixel image data, the first green sub-pixel image data, and the first blue sub-pixel image data to obtain a second red sub-pixel image data, a second green sub-pixel image data, and a second blue sub-pixel image data; (C) generating a first white sub-pixel image data according to the second red sub-pixel image data, the second green sub-pixel image data, and the second blue sub-pixel image data; (D) generating a third red sub-pixel image data, a third green sub-pixel image data, and a third blue sub-pixel image data according to the second red sub-pixel image data, the second green sub-pixel image data, the second blue sub-pixel image data, and the first white sub-pixel image data; (E) executing an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

In the above described image data processing method, the step (D) comprises the following steps: (d1)) determining a maximum value among the second red sub-pixel image data, the second green sub-pixel image data, and the second blue sub-pixel image data; (d2) calculating a gain coefficient according to the following formula: the gain coefficient=(a grayscale value corresponding to the first white sub-pixel image data+the maximum value)/(the maximum value); (d3) generating the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

In the above described image data processing method, the step (d3) comprises the following steps: (d31) calculating a grayscale value corresponding to the third red sub-pixel image data according to the following formula: the grayscale value corresponding to the third red sub-pixel image data=a grayscale value corresponding to the second red sub-pixel image data*the gain coefficient−the grayscale value corresponding to the first white sub-pixel image data; (d32) calculating a grayscale value corresponding to the third green sub-pixel image data according to the following formula: the grayscale value corresponding to the third green sub-pixel image data=a grayscale value corresponding to the second green sub-pixel image data*the gain coefficient−the grayscale value corresponding to the first white sub-pixel image data; (d33) calculating a grayscale value corresponding to the third blue sub-pixel image data according to the following formula: the grayscale value corresponding to the third blue sub-pixel image data=a grayscale value corresponding to the second blue sub-pixel image data*the gain coefficient−the grayscale value corresponding to the first white sub-pixel image data.

In the above described image data processing method, the step (C) comprises the following steps: (c1) calculating a grayscale value corresponding to the first white sub-pixel image data according to the following formula: the grayscale value corresponding to the first white sub-pixel image data=2 times a preset variable to the fifth power−4 times the preset variable 1.0 to the fourth power+the preset variable to the third power+the preset variable to the second power+the preset variable, wherein the value of the preset variable is smaller than a predetermined value; or the grayscale value corresponding to the first white sub-pixel image data=−2 times a preset variable to the fifth power+9 times the preset variable to the fourth power−14 times the preset variable to the third power+8 times the preset variable to the second power, wherein the value of the preset variable is greater than or equal to the predetermined value.

In the above described image data processing method, the preset variable equals the smallest value among a grayscale value corresponding to the second red sub-pixel image data, a grayscale value corresponding to the second green sub-pixel image data and a grayscale value corresponding to the second blue sub-pixel image data.

In the above described image data processing method, the predetermined value is in the range of 105 to 144.

In the above described image data processing method, the predetermined value is in the range of 115 to 134.

In the above described image data processing method, the predetermined value is 124.

A image data processing device is provided, the device comprises: a receiving module used to receive a first image data, wherein the first image data comprises a first red sub-pixel image data, a first green sub-pixel image data, and a first blue sub-pixel image data; a gamma correction processing module used to execute a gamma correction process for the first red sub-pixel image data, the first green sub-pixel image data, and the first blue sub-pixel image data to obtain a second red sub-pixel image data, a second green sub-pixel image data, and a second blue sub-pixel image data; a first image data generating module used to generate a first white sub-pixel image data according to the second red sub-pixel image data, the second green sub-pixel image data, and the second blue sub-pixel image data; a second image data generating module used to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data; an inverse gamma conversion processing module used to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data.

In the above described image data processing device, the second image data generating module is further used to determine a maximum value among the second red sub-pixel image data, the second green sub-pixel image data, and the second blue sub-pixel image data; the second image data generating module further used to calculate a gain coefficient according to the following formula: the gain coefficient=(a grayscale value corresponding to the first white sub-pixel image data+the maximum value)/(the maximum value); the second image data generating module is further used to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

In the above described image data processing device, the second image data generating module is further used to calculate a grayscale value corresponding to the third red sub-pixel image data according to the following formula: the grayscale value corresponding to the third red sub-pixel image data=a grayscale value corresponding to the second red sub-pixel image data*the gain coefficient−the grayscale value corresponding to the first white sub-pixel image data; the second image data generating module is further used to calculate a grayscale value corresponding to the third green sub-pixel image data according to the following formula: the grayscale value corresponding to the third green sub-pixel image data=a grayscale value corresponding to the second green sub-pixel image data*the gain coefficient−the grayscale value corresponding to the first white sub-pixel image data; the second image data generating module is further used to calculate a grayscale value corresponding to the third blue sub-pixel image data according to the following formula: the grayscale value corresponding to the third blue sub-pixel image data=a grayscale value corresponding to the second blue sub-pixel image data*the gain coefficient−the grayscale value corresponding to the first white sub-pixel image data.

In the above described image data processing device, the first image data processing module is further used to calculate a grayscale value corresponding to the first white sub-pixel image data according to the following formula: the grayscale value corresponding to the first white sub-pixel image data=2 times a preset variable to the fifth power−4 times the preset variable to the fourth power+the preset variable to the third power+the preset variable to the second power+the preset variable, wherein the value of the preset variable is smaller than a predetermined value; or the grayscale value corresponding to the first white sub-pixel image data=−2 times a preset variable to the fifth power+9 times the preset variable to the fourth power−14 times the preset variable to the third power+8 times the preset variable to the second power, wherein the value of the preset variable is greater than or equal to the predetermined value.

In the above described image data processing device, the preset variable equals the smallest value among a grayscale value corresponding to the second red sub-pixel image data, a grayscale value corresponding to the second green sub-pixel image data, and a grayscale value corresponding to the second blue sub-pixel image data.

In the above described image data processing device, the predetermined value is in the range of 105 to 144.

In the above described image data processing device, the predetermined value is in the range of 115 to 134.

In the above described image data processing device, the predetermined value is 124.

With respect to the prior art, the present invention is implemented to convert RGB image data to RGBW image data, thereby increasing the display brightness of a display panel. In the present invention, the display panel saves more power when it displays an image with equivalent brightness, or the display panel achieves a higher brightness while consuming an equivalent electrical power.

To allow the above description of the present invention to be more clear and comprehensive, there are preferred embodiments with the accompanying figures described in detail below

DETAILED DESCRIPTION OF THE PREFERRED EMBODIMENTS

The word "embodiment" used in this specification means examples, demonstrations, or illustrations. In addition, the word "a" used in this specification and the corresponding claims can be explained as "one or more", unless it is designated or clearly guided to a singular form.

Figure 1:
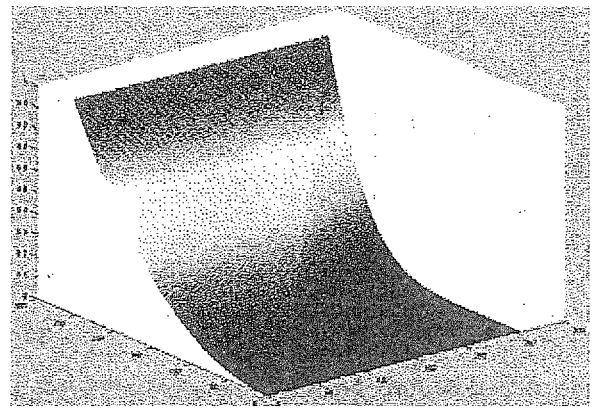
FIG. 1 is a schematic diagram of evaluation of grayscale values for Ro, Go, and Bo in the prior art.
Figure 2:
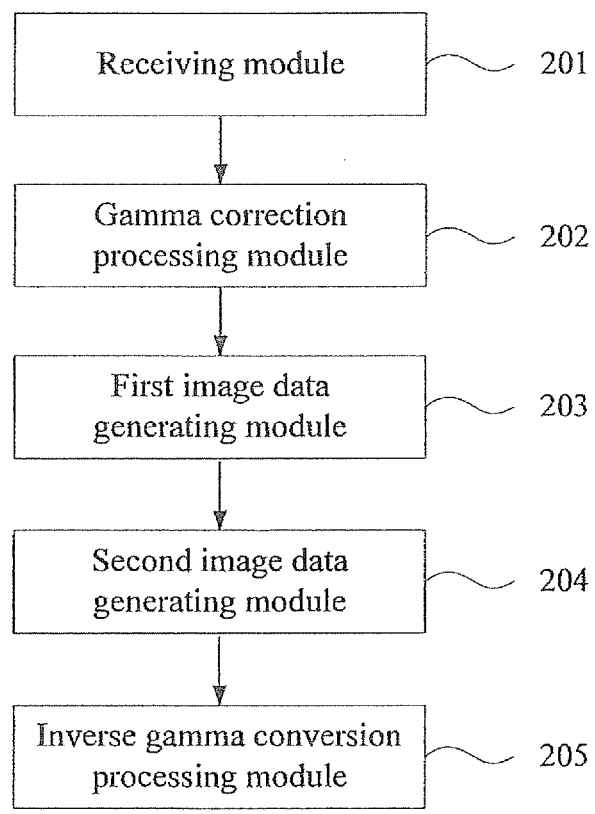
FIG. 2 is a block diagram of an image data processing device according to the first embodiment of the present invention.

Refer to FIG. 2, which is a block diagram of an image data processing device according to the first embodiment of the present invention.

The image data processing device of the present embodiment is adapted for a display panel. The display panel can be a TFT-LCD (Thin Film Transistor Liquid Crystal Display), AMOLED (Active Matrix Organic Light Emitting Diode), etc.

The image data processing device of the present invention includes a receiving module, a gamma correction processing module, a first image data generating module, a second image data generating module, and an inverse gamma conversion processing module.

The receiving module is used to receive a first image data, wherein the first image data comprises a first red sub-pixel image data, a first green sub-pixel image data, and a first blue sub-pixel image data. Grayscale values corresponding to the first red sub-pixel image data, the first green sub-pixel image data, or the first blue sub-pixel image data are named R, G, and B, respectively.

The gamma correction processing module is used to execute a gamma correction process for the first red sub-pixel image data, the first green sub-pixel image data, and the first blue sub-pixel image data to obtain a second red sub-pixel image data, a second green sub-pixel image data, and a second blue sub-pixel image data. Grayscale values corresponding to the second red sub-pixel image data, the second green sub-pixel image data, and the second blue sub-pixel image data are named Ri, Gi, and Bi, respectively.

The first image data generating module is used to generate a first white sub-pixel image data according to the second red sub-pixel image data, the second green sub-pixel image data, and the second blue sub-pixel image data. A grayscale value corresponding to the first white sub-pixel image data is named Wo.

The second image data generating module is used to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data. Grayscale values corresponding to the third red sub-pixel image data, the third green sub-pixel image data, and the third blue sub-pixel image data are named Ro, Go, and Bo, respectively.

The inverse gamma conversion processing module is used to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data. The fourth red sub-pixel image data, the fourth green sub-pixel image data, the fourth blue sub-pixel image data, and the second white sub-pixel image data correspond to grayscale values of the processed data R, G, B, and W, respectively.

The above described technical solution is implemented to convert RGB image data to RGBW image data. RGBW image data has a W component, and therefore is conducive to increasing the display brightness of a display panel. The display panel saves more power when it displays an image of an equivalent brightness, or the display panel achieves a higher brightness while consuming an equivalent electrical power.

The image data processing device of the second embodiment is similar to the image data processing device of the first embodiment, and the difference is as follows:

The second image data generating module is further used to determine a maximum value among the second red sub-pixel image data, the second green sub-pixel image data, and the second blue sub-pixel image data. Namely, the second image data generating module is further used to determine max=max [Ri, Gi, Bi].

The second image data generating module is further used to calculate a gain coefficient according to the following formula:

The gain coefficient=(the grayscale value corresponding to the first white sub-pixel image data+the maximum value)/(the maximum value). The gain coefficient is named S, namely, S=(Wo+max)/max.

The second image data generating module is further used to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

The image data processing device of the third embodiment is similar to the image data processing device of the second embodiment, and the difference is as follows:

The second image data generating module is further used to calculate the grayscale value corresponding to the third red sub-pixel image data according to the following formula:

The grayscale value corresponding to the third red sub-pixel image data=the grayscale value corresponding to the second red sub-pixel image data*the gain coefficient−the grayscale value corresponding to the first white sub-pixel image data, namely, Ro=Ri*S−Wo.

The second image data generating module is further used to calculate the grayscale value corresponding to the third green sub-pixel image data according to the following formula:

The grayscale value corresponding to the third green sub-pixel image data=the grayscale value corresponding to the second green sub-pixel image data*the gain coefficient−the grayscale value corresponding to the first white sub-pixel image data, namely, Go=Gi*S−Wo.

The second image data generating module is further used to calculate the grayscale value corresponding to the third blue sub-pixel image data according to the following formula:

The grayscale value corresponding to the third blue sub-pixel image data=the grayscale value corresponding to the second blue sub-pixel image data*the gain coefficient−the grayscale value corresponding to the first white sub-pixel image data, namely, Bo=Bi*S−Wo.

The image data processing device of the fourth embodiment is similar to the image data processing device of any one of the above described first to third embodiments, and the difference is as follows:

The first image data processing module is further used to calculate a grayscale value corresponding to the first white sub-pixel image data according to the following formula:

The grayscale value corresponding to the first white sub-pixel image data=2 times a preset variable to the fifth power−4 times the preset variable to the fourth power+the preset variable to the third power+the preset variable to the second power+the preset variable, and the value of the preset variable is smaller than a predetermined value. The preset variable is named X, namely, $wo=2*X^5-4*X^4+X^3+X^2+X$. X is smaller than the predetermined value.

Or, the grayscale value corresponding to the first white sub-pixel image data=−2 times a preset variable to the fifth power+9 times the preset variable to the fourth power−14 times the preset variable to the third power+8 times the preset variable to the second power, and the value of the preset variable is greater than or equal to the predetermined value. Namely, $Wo=-2*X^5+9*X^4-14X^3+8X^2$, and X is greater than or equal to the predetermined value.

In the present embodiment, the preset variable equals the smallest value among a grayscale value corresponding to the second red sub-pixel image data, a grayscale value corresponding to the second green sub-pixel image data, and a grayscale value corresponding to the second blue sub-pixel image data, namely, X=min=min[Ri, Gi, Bi].

Figure 3:
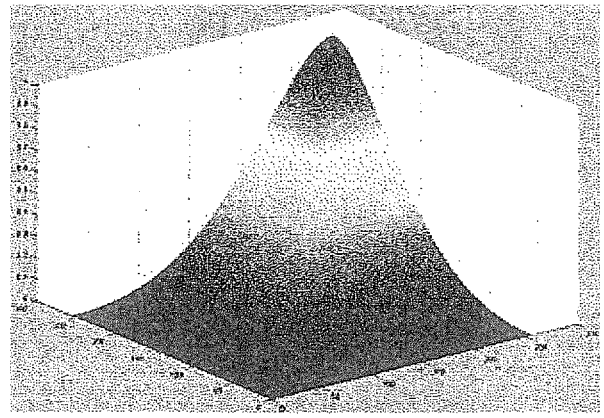
FIG. 3 is a schematic diagram of evaluation of grayscale values for Ro, Go, and Bo in accordance with the present invention.

As illustrated in FIG. 3, the values of Ro, Go, Bo, and Wo are evaluated smoothly and color deviation is avoided.

In the present embodiment, the predetermined value is in the range of 105 to 144, namely 105≤min≤144.

Preferably, the predetermined value is in the range of 115 to 134, namely 115≤min≤144.

Furthermore, the predetermined value is 124.

Figure 4:
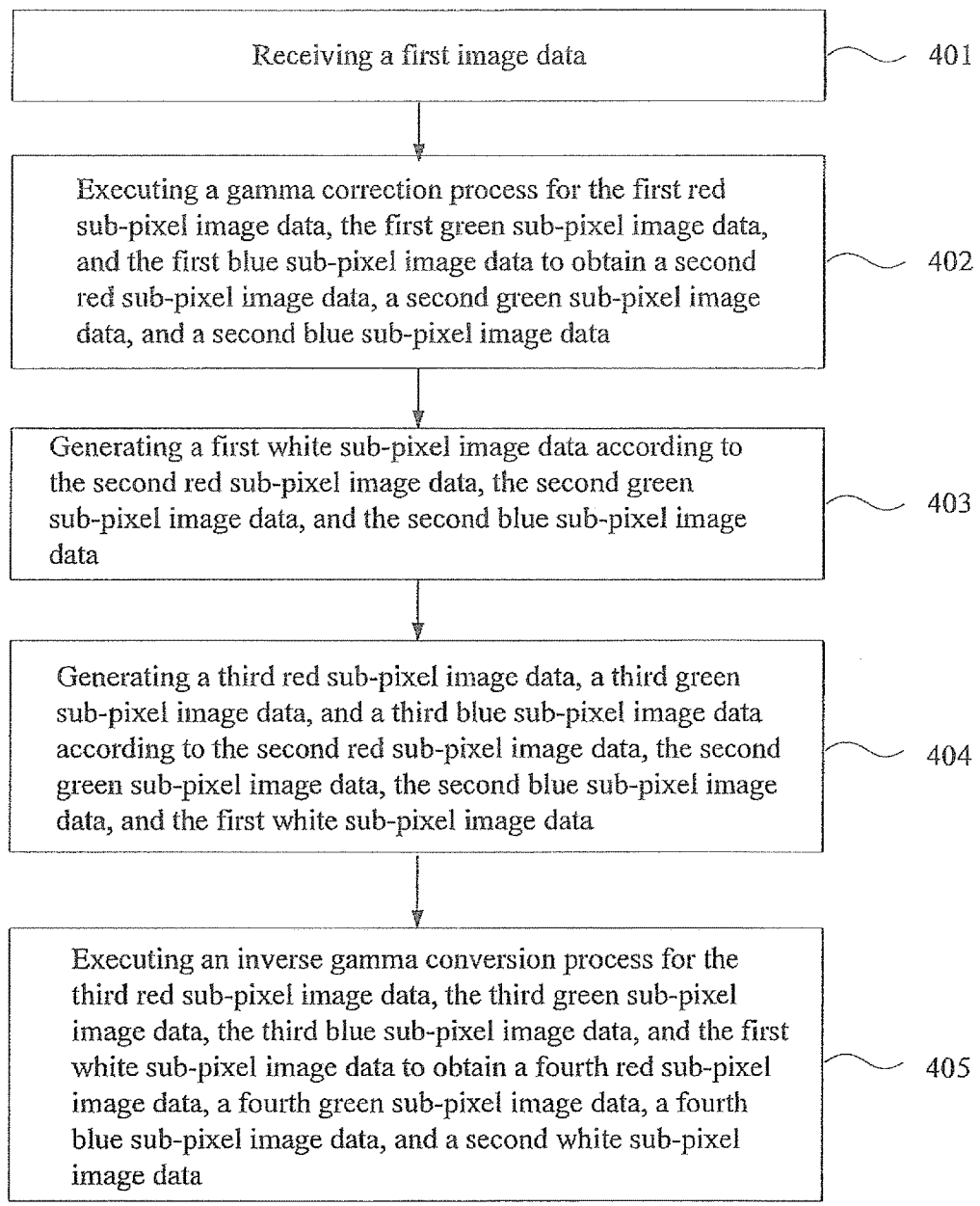
FIG. 4 is a flowchart of an image data processing method according to the first embodiment of the present invention.

Refer to FIG. 4, which is a flowchart of an image data processing method according to the first embodiment of the present invention. The image data processing method of the present invention is implemented by the above described image data processing device.

The image data processing method of the present invention comprises the following steps:

Step 401, the receiving module is used to receive a first image data, wherein the first image data comprises a first red sub-pixel image data, a first green sub-pixel image data, and a first blue sub-pixel image data. Grayscale values corresponding to the first red sub-pixel image data, the first green sub-pixel image data, or the first blue sub-pixel image data are named R, G, and B, respectively.

Step 402, the gamma correction processing module is used to execute a gamma correction process for the first red sub-pixel image data, the first green sub-pixel image data, and the first blue sub-pixel image data to obtain a second red sub-pixel image data, a second green sub-pixel image data, and a second blue sub-pixel image data. Grayscale values corresponding to the second red sub-pixel image data, the second green sub-pixel image data, and the second blue sub-pixel image data are named Ri, Gi, and Bi, respectively.

Step 403, the first image data generating module is used to generate a first white sub-pixel image data according to the second red sub-pixel image data, the second green sub-pixel image data, and the second blue sub-pixel image data. A grayscale value corresponding to the first white sub-pixel image data is named Wo.

Step 404, the second image data generating module is used to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data. A grayscale value corresponding to the third red sub-pixel image data, the third green sub-pixel image data, and the third blue sub-pixel image data are named Ro, Go, and Bo respectively.

Step 405, the inverse gamma conversion processing module is used to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data. The fourth red sub-pixel image data, the fourth green sub-pixel image data, the fourth blue sub-pixel image data, and the second white sub-pixel image data correspond to a grayscale value of the processed data R, G, B, and W respectively.

The above described technical solution is implemented to convert RGB image data to RGBW image data. RGBW image data has a W component, and therefore which is conducive to increasing the display brightness of a display panel. The display panel saves more power when it displays an image of an equivalent brightness, or the display panel achieves a higher brightness when consuming an equivalent electrical power.

Figure 5:
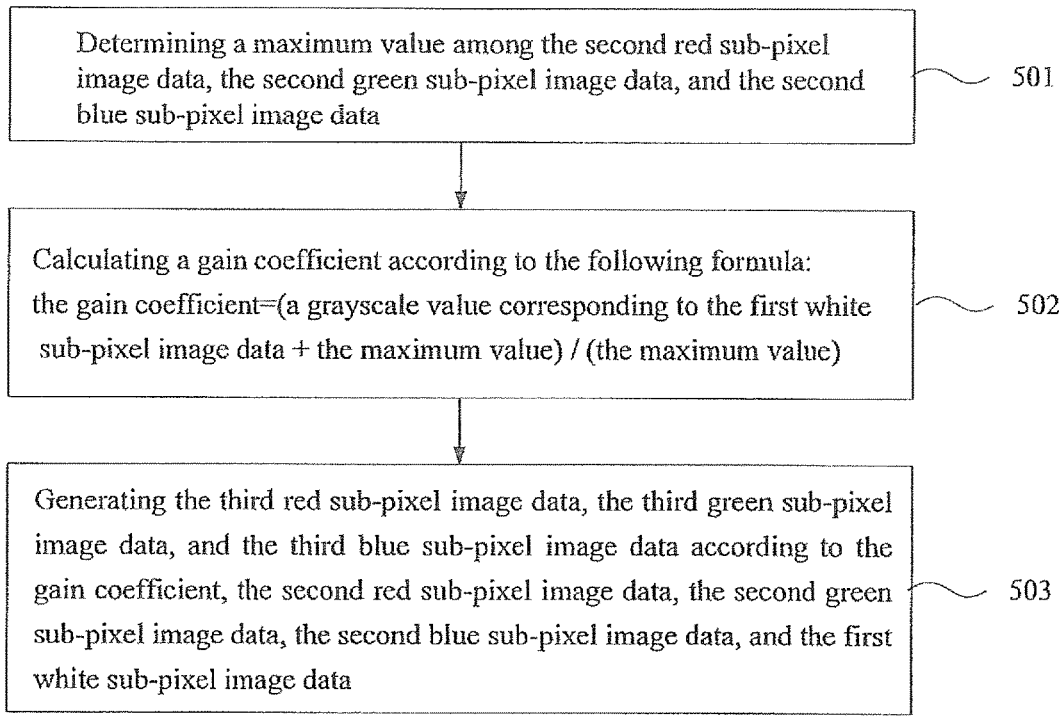
FIG. 5 is a flowchart of an image data processing method according to the second embodiment of the present invention.

Refer the FIG. 5, which is a flowchart of an image data processing method according to the second embodiment of the present invention. The present embodiment is similar to the above described first embodiment, and the difference is as follows:

In the present embodiment, step 404 comprises the following steps:

Step 501, the second image data generating module is further used to determine a maximum value among the second red sub-pixel image data, the second green sub-pixel image data, and the second blue sub-pixel image data.

Namely, the second image data generating module is further used to determine max=max [Ri, Gi, Bi].

Step 502, the second image data generating module is further used to calculate a gain coefficient according to the following formula:

The gain coefficient=(the grayscale value corresponding to the first white sub-pixel image data+the maximum value)/(the maximum value). The gain coefficient is named S, namely, $S=(Wo+max)/max$.

Step 503, the second image data generating module is further used to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

The image data processing method of the third embodiment is similar to the image data processing method of the first embodiment, and the difference is as follows:

Step 503 comprises the following steps:

Step 5031, the second image data generating module is further used to calculate the grayscale value corresponding to the third red sub-pixel image data according to the following formula:

The grayscale value corresponding to the third red sub-pixel image data=the grayscale value corresponding to the second red sub-pixel image data*the gain coefficient−the grayscale value corresponding to the first white sub-pixel image data, namely, $Ro=Ri*S-Wo$.

Step 5032, the second image data generating module is further used to calculate the grayscale value corresponding to the third green sub-pixel image data according to the following formula:

The grayscale value corresponding to the third green sub-pixel image data=the grayscale value corresponding to the second green sub-pixel image data*the gain coefficient−the grayscale value corresponding to the first white sub-pixel image data, namely, $Go=Gi*S-Wo$.

Step 5033, the second image data generating module is further used to calculate the grayscale value corresponding to the third blue sub-pixel image data according to the following formula:

The grayscale value corresponding to the third blue sub-pixel image data=the grayscale value corresponding to the second blue sub-pixel image data*the gain coefficient−the grayscale value corresponding to the first white sub-pixel image data, namely, $Bo=Bi*S-Wo$.

The image data processing method of the fourth embodiment is similar to the image data processing method of any one of the above described first to third embodiments, and the difference is as follows:

Step 403 comprises the following steps:

Step 4031, the first image data processing module is further used to calculate a grayscale value corresponding to the first white sub-pixel image data according to the following formula:

The grayscale value corresponding to the first white sub-pixel image data=2 times a preset variable to the fifth power−4 times the preset variable to the fourth power+the preset variable to the third power+the preset variable to the second power+the preset variable, and the value of the preset variable is smaller than a predetermined value. The preset variable is named X, namely, $wo=2*X^5-4*X^4+X^3+X^2+X$. X is smaller than the predetermined value.

Or, the grayscale value corresponding to the first white sub-pixel image data=−2 times a preset variable to the fifth power+9 times the preset variable to the fourth power−14 times the preset variable to the third power+8 times the preset variable to the second power, and the value of the preset variable is greater than or equal to the predetermined value. Namely, $Wo=-2*X^5+9*X^4-14X^3+8X^2$, and X is greater than or equal to the predetermined value.

In the present embodiment, the preset variable equals the smallest value among a grayscale value corresponding to the second red sub-pixel image data, a grayscale value corresponding to the second green sub-pixel image data, and a grayscale value corresponding to the second blue sub-pixel image data, namely, X=min=min[Ri, Gi, Bi].

As illustrated in FIG. 3, the values of Ro, Go, Bo, and Wo are evaluated smoothly and color deviation is avoided.

In the present embodiment, the predetermined value is in the range of 105 to 144, namely 105≤min≤144.

Preferably, the predetermined value is in the range of 115 to 134, namely 115≤min≤144.

Furthermore, the predetermined value is 124.

In the image data processing method and device thereof, the formula is:

The grayscale value corresponding to the first white sub-pixel image data=2 times a preset variable to the fifth power−4 times the preset variable to the fourth power+the preset variable to the third power+the preset variable to the second power+the preset variable, and the value of the preset variable is smaller than a predetermined value. The preset variable is named X, namely, wo=2*X^5−4*X^4+X^3+X^2+X. X is smaller than the predetermined value;

Or, the grayscale value corresponding to the first white sub-pixel image data=−2 times a preset variable to the fifth power+9 times the preset variable to the fourth power−14 times the preset variable to the third power+8 times the preset variable to the second power, and the value of the preset variable is greater than or equal to the predetermined value. Namely, Wo=−2*X^5+9*X^4−14X^3+8X^2, and X is greater than or equal to the predetermined value.

The above described formula is derived by the following steps:

Step one, setting a variable "min", the general formula of the variable "min" to the fifth power is as follows:

$$Wo(\min)=a*\min^5+b*\min^4+c*\min^3+d*\min^2+e*\min+f; \quad (1)$$

The a, b, c, d, e, and f are constants.

The above described general formula (1) satisfies the following condition:

Condition 1, W(0)=0; namely, f=0; (There is no W component when the value of "min" is equal to 0.)

Condition 2, W(1)=1; namely, a+b+c+d+e+f=1; (Let "W" be the maximum value when the "min" is equal to 1, so as to ensure the requirement of maximizing Wo.)

Condition 3, W'(1)=0; namely, 5*a+4*b+3*c+2*d+e=0; (When "min" is 1, the first order derivative of Wo is 0 so as to ensure "Wo" has only one extreme value, thereby maximizing "Wo".)

Condition 4, W'(x)≥0; namely, 5*a*min^4+4*b*min^3+3*c*min^2+2*d*min+e≥0; (Which ensures the monotonically increasing characteristics.)

Condition 5, W''(0)≥0; namely, 2*d≥0; (In a low grayscale place, the gain of Wo is progressively increased. When the "min" is 0, the second order derivative of Wo is greater than or equal to 0.)

Condition 6, Ro≥0; (Which ensures that the final Ro is not overflowing or is negative.)

Condition 7, Go≥0; (Which ensures that the final Go is not overflowing or is negative.)

Condition 8, Bo≥0; (Which ensures that the final Bo is not overflowing or is negative.)

Step two, matching a, b, c, d, and e;

The range of each of a, b, c, d, and e is [−50, 50].

Figure 6:
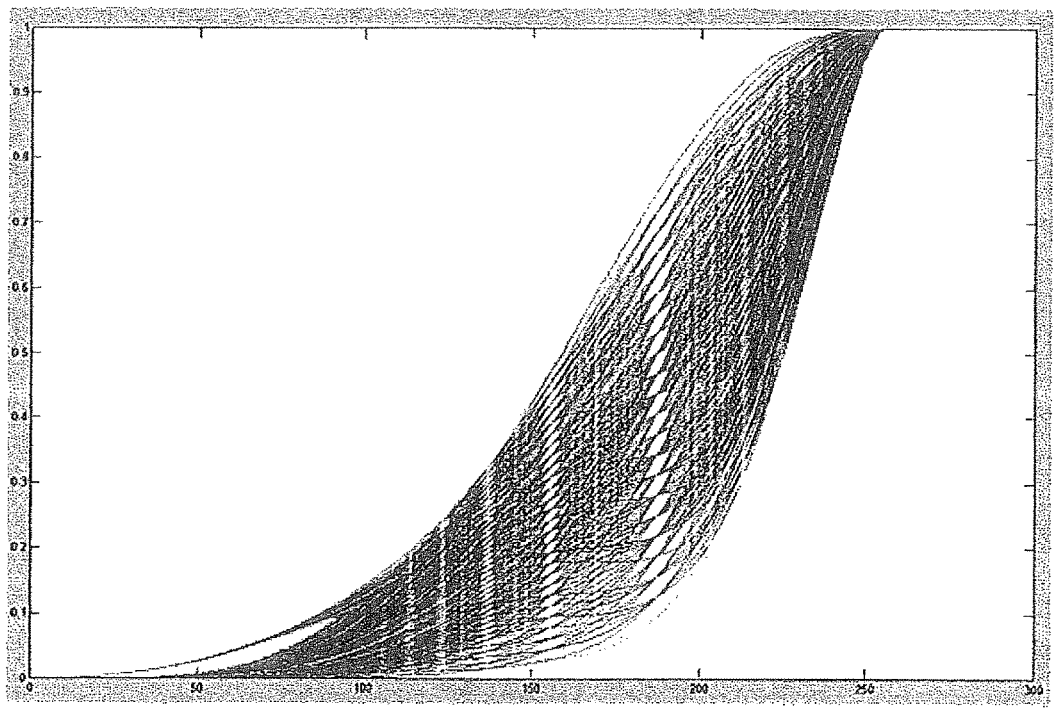
FIG. 6 is a schematic diagram of a curve of first white sub-pixel image data obtained through a deriving process of a formula for calculating a grayscale value of the first white sub-pixel image data.

Therefore, a curve of Wo is obtained, and the curve fulfills all of the conditions, as illustrated in FIG. 6.

Step three, evaluating the maximum value according to Condition 2, from the figure, it can be directly determined that the outermost curve is the optimal.

Then, there are two curves can be found:

$$Wo=2*\min^5-4*\min^4+\min^3+\min^2+\min;$$

and $$Wo=-2*\min^5+9*\min^4-14*\min^3+8*\min^2.$$

Step four, calculating an intersection of the two curves, the intersection is between the grayscale values 123 and 124; Therefore, the above described formula can be obtained:

$$Wo=2*\min^5-4*\min^4+\min^3+\min^2+\min, \text{ wherein the min<124; and}$$

$$Wo=-2*\min^5+9*\min^4-14*\min^3+8*\min^2,$$
wherein the min≥124.

There are one or more implementations represented or described for the present invention, but those who skilled in the art may provide some equivalent variations and modifications based on the understanding of the specification and the figures. The present invention comprises all the equivalent variations and modifications and is only constrained by the claims. Especially regarding the various functions of the above described components, the terms describing the components mean corresponding to any element (unless specially defined) with a specified function (for example, with the equivalent function) of the implemented component, even if there is a different structure in comparison to the exemplary embodiments of the present specification. Furthermore, even though the specification discloses only an implementation of the specified feature, the specified feature can be combined with other characteristics if there are some advantages. In addition, the terms "including", "having", or other like terms used in detailed description or claims are similar to the meaning of the word "comprising."

In summary, the present invention has been described with preferred embodiments thereof, but the above described preferred embodiments are not intended to limit the present invention. Those who are skilled in the art can make many changes and modifications to the described embodiment which can be carried out without departing from the scope and the spirit of the invention that is intended to be limited only by the appended claims.

What is claimed is:

1. An image data processing method, characterized in that the method comprises the following steps:
   (A) using a display comprising a processor and a memory comprising a plurality of program instructions executable by the processor to receive a first image data, wherein the first image data comprises a first red sub-pixel image data, a first green sub-pixel image data, and a first blue sub-pixel image data;
   (B) using the processor to execute the plurality of program instructions to execute a gamma correction process for the first red sub-pixel image data, the first green sub-pixel image data, and the first blue sub-pixel image data to obtain a second red sub-pixel image data, a second green sub-pixel image data, and a second blue sub-pixel image data;
   (C) using the processor to execute the plurality of program instructions to generate a first white sub-pixel image data according to the second red sub-pixel image data, the second green sub-pixel image data, and the second blue sub-pixel image data;
   (D) using the processor to execute the plurality of program instructions to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and (E) using the processor to execute the plurality of program instructions to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data;

wherein the step (D) comprises the following steps:

(d1) using the processor to execute the plurality of program instructions to determine a maximum value among the second red sub-pixel image data, the second green sub-pixel image data, and the second blue sub-pixel image data;

(d2) using the processor to execute the plurality of program instructions to calculate a gain coefficient according to the following formula:

the gain coefficient=(a grayscale value corresponding to the first white sub-pixel image data+the maximum value)/(the maximum value);

(d3) using the processor to execute the plurality of program instructions to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data;

wherein the step (C) comprises the following steps:

(c1) using the processor to execute the plurality of program instructions to calculate the grayscale value corresponding to the first white sub-pixel image data according to the following formula:

the grayscale value corresponding to the first white sub-pixel image data=2 times a preset variable to the fifth power−4 times the preset variable to the fourth power+the preset variable to the third power+the preset variable to the second power+the preset variable, wherein the value of the preset variable is smaller than a predetermined value;

or the grayscale value corresponding to the first white sub-pixel image data=−2 times a preset variable to the fifth power+9 times the preset variable to the fourth power−14 times the preset variable to the third power+8 times the preset variable to the second power, wherein the value of the preset variable is greater than or equal to the predetermined value.

2. The image data processing method according to claim 1, characterized in that the step (d3) comprises the following steps:

(d31) using the processor to execute the plurality of program instructions to calculate a grayscale value corresponding to the third red sub-pixel image data according to the following formula:

the grayscale value corresponding to the third red sub-pixel image data=a grayscale value corresponding to the second red sub-pixel image data*the gain coefficient−the grayscale value corresponding to the first white sub-pixel image data;

(d32) using the processor to execute the plurality of program instructions to calculate a grayscale value corresponding to the third green sub-pixel image data according to the following formula:

the grayscale value corresponding to the third green sub-pixel image data=a grayscale value corresponding to the second green sub-pixel image data*the gain coefficient−the grayscale value corresponding to the first white sub-pixel image data; and (d33) using the processor to execute the plurality of program instructions to calculate a grayscale value corresponding to the third blue sub-pixel image data according to the following formula:

the grayscale value corresponding to the third blue sub-pixel image data=a grayscale value corresponding to the second blue sub-pixel image data*the gain coefficient−the grayscale value corresponding to the first white sub-pixel image data.

3. The image data processing method according to claim 1, characterized in that the preset variable equals the smallest value among the grayscale value corresponding to the second red sub-pixel image data, the grayscale value corresponding to the second green sub-pixel image data, and the grayscale value corresponding to the second blue sub-pixel image data.

4. The image data processing method according to claim 1, characterized in that the predetermined value is in the range of 105 to 144.

5. An image data processing method, characterized in that the method comprises the following steps:

(A) using a display comprising a processor and a memory comprising a plurality of program instructions executable by the processor to receive a first image data, wherein the first image data comprises a first red sub-pixel image data, a first green sub-pixel image data, and a first blue sub-pixel image data;

(B) using the processor to execute the plurality of program instructions to execute a gamma correction process for the first red sub-pixel image data, the first green sub-pixel image data, and the first blue sub-pixel image data to obtain a second red sub-pixel image data, a second green sub-pixel image data, and a second blue sub-pixel image data;

(C) using the processor to execute the plurality of program instructions to generate a first white sub-pixel image data according to the second red sub-pixel image data, the second green sub-pixel image data, and the second blue sub-pixel image data;

(D) using the processor to execute the plurality of program instructions to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and (E) using the processor to execute the plurality of program instructions to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data, wherein the step (D) comprises the following steps:

(d1) using the processor to execute the plurality of program instructions to determine a maximum value among the second red sub-pixel image data, the second green sub-pixel image data, and the second blue sub-pixel image data;

(d2) using the processor to execute the plurality of program instructions to calculate a gain coefficient according to the following formula:
the gain coefficient=(a grayscale value corresponding to the first white sub-pixel image data+the maximum value)/(the maximum value); and
(d3) using the processor to execute the plurality of program instructions to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

6. The image data processing method according to claim 5, characterized in that the step (d3) comprises the following steps:
(d31) using the processor to execute the plurality of program instructions to calculate a grayscale value corresponding to the third red sub-pixel image data according to the following formula:
the grayscale value corresponding to the third red sub-pixel image data=a grayscale value corresponding to the second red sub-pixel image data*the gain coefficient−the grayscale value corresponding to the first white sub-pixel image data;
(d32) using the processor to execute the plurality of program instructions to calculate a grayscale value corresponding to the third green sub-pixel image data according to the following formula:
the grayscale value corresponding to the third green sub-pixel image data=a grayscale value corresponding to the second green sub-pixel image data*the gain coefficient−the grayscale value corresponding to the first white sub-pixel image data; and
(d33) using the processor to execute the plurality of program instructions to calculate a grayscale value corresponding to the third blue sub-pixel image data according to the following formula:
the grayscale value corresponding to the third blue sub-pixel image data=a grayscale value corresponding to the second blue sub-pixel image data*the gain coefficient−the grayscale value corresponding to the first white sub-pixel image data.

7. The image data processing method according to claim 5, characterized in that the step (C) comprises the following steps:
(c1) using the processor to execute the plurality of program instructions to calculate a grayscale value corresponding to the first white sub-pixel image data according to the following formula:
the grayscale value corresponding to the first white sub-pixel image data=2 times a preset variable to the fifth power−4 times the preset variable to the fourth power+the preset variable to the third power+the preset variable to the second power+the preset variable, wherein the value of the preset variable is smaller than a predetermined value; or
the grayscale value corresponding to the first white sub-pixel image data=−2 times a preset variable to the fifth power+9 times the preset variable to the fourth power−14 times the preset variable to the third power+8 times the preset variable to the second power, wherein the value of the preset variable is greater than or equal to the predetermined value.

8. The image data processing method according to claim 7, characterized in that the preset variable equals the smallest value among a grayscale value corresponding to the second red sub-pixel image data, a grayscale value corresponding to the second green sub-pixel image data, and a grayscale value corresponding to the second blue sub-pixel image data.

9. The image data processing method according to claim 7, characterized in that the predetermined value is in the range of 105 to 144.

10. The image data processing method according to claim 9, characterized in that the predetermined value is in the range of 115 to 134.

11. The image data processing method according to claim 10, characterized in that the predetermined value is 124.

12. An image data processing device, characterized in that the device comprises:
a processor; and
a memory connected with processor, the memory comprising a plurality of program instructions executable by the processor, the plurality of program instructions comprising:
a receiving module configured to cause the processor to receive a first image data, wherein the first image data comprises a first red sub-pixel image data, a first green sub-pixel image data, and a first blue sub-pixel image data;
a gamma correction processing module used to execute a gamma correction process for the first red sub-pixel image data, the first green sub-pixel image data, and the first blue sub-pixel image data to obtain a second red sub-pixel image data, a second green sub-pixel image data, and a second blue sub-pixel image data;
a first image data generating module configured to cause the processor to generate a first white sub-pixel image data according to the second red sub-pixel image data, the second green sub-pixel image data, and the second blue sub-pixel image data;
a second image data generating module configured to cause the processor to generate a third red sub-pixel image data, a third green sub-pixel image data, and a third blue sub-pixel image data according to the second red sub-pixel image data, the second green sub-pixel image data, the second blue sub-pixel image data, and the first white sub-pixel image data; and
an inverse gamma conversion processing module configured to cause the processor to execute an inverse gamma conversion process for the third red sub-pixel image data, the third green sub-pixel image data, the third blue sub-pixel image data, and the first white sub-pixel image data to obtain a fourth red sub-pixel image data, a fourth green sub-pixel image data, a fourth blue sub-pixel image data, and a second white sub-pixel image data,
wherein the second image data generating module is further configured to cause the processor to determine a maximum value among the second red sub-pixel image data, the second green sub-pixel image data, and the second blue sub-pixel image data;
the second image data generating module further configured to cause the processor to calculate a gain coefficient according to the following formula:
the gain coefficient=(a grayscale value corresponding to the first white sub-pixel image data+the maximum value)/(the maximum value);
the second image data generating module further configured to cause the processor to generate the third red sub-pixel image data, the third green sub-pixel image data, and the third blue sub-pixel image data according to the gain coefficient, the second red sub-pixel image data, the second green sub-pixel image data, the second blue sub-pixel image data, and the first white sub-pixel image data.

13. The image data processing device according to claim 12, characterized in that the second image data generating module is further configured to cause the processor to calculate a grayscale value corresponding to the third red sub-pixel image data according to the following formula:

the grayscale value corresponding to the third red sub-pixel image data=a grayscale value corresponding to the second red sub-pixel image data*the gain coefficient−the grayscale value corresponding to the first white sub-pixel image data;

wherein the second image data generating module is further configured to cause the processor to calculate a grayscale value corresponding to the third green sub-pixel image data according to the following formula:

the grayscale value corresponding to the third green sub-pixel image data=a grayscale value corresponding to the second green sub-pixel image data*the gain coefficient−the grayscale value corresponding to the first white sub-pixel image data;

wherein the second image data generating module is further configured to cause the processor to calculate a grayscale value corresponding to the third blue sub-pixel image data according to the following formula:

the grayscale value corresponding to the third blue sub-pixel image data=a grayscale value corresponding to the second blue sub-pixel image data*the gain coefficient−the grayscale value corresponding to the first white sub-pixel image data.

14. The image data processing device according to claim 12, characterized in that the first image data processing module is further a grayscale value corresponding to the first white sub-pixel image data according to the following formula:

the grayscale value corresponding to the first white sub-pixel image data=2 times a preset variable to the fifth power−4 times the preset variable to the fourth power+the preset variable to the third power+the preset variable to the second power+the preset variable, wherein the value of the preset variable is smaller than a predetermined value; or the grayscale value corresponding to the first white sub-pixel image data=−2 times a preset variable to the fifth power+9 times the preset variable to the fourth power−14 times the preset variable to the third power+8 times the preset variable to the second power, wherein the value of the preset variable is greater than or equal to the predetermined value.

15. The image data processing device according to claim 14, characterized in that the preset variable equals the smallest value among a grayscale value corresponding to the second red sub-pixel image data, a grayscale value corresponding to the second green sub-pixel image data, and a grayscale value corresponding to the second blue sub-pixel image data.

16. The image data processing device according to claim 14, characterized in that the predetermined value is in the range of 105 to 144.

17. The image data processing device according to claim 16, characterized in that the predetermined value is in the range of 115 to 134.

18. The image data processing device according to claim 17, characterized in that the predetermined value is 124.

\* \* \* \* \*